(12) United States Patent
Wang (10) Patent No.: US 9,098,156 B2
(45) Date of Patent: Aug. 4, 2015

(54) TOUCH SENSING DEVICE

(71) Applicant: Nuvoton Technology Corporation, Hsinchu (TW)

(72) Inventor: Cheng-Chih Wang, Hsinchu County (TW)

(73) Assignee: Nuvoton Technology Corporation, Hsinchu (TW)

( * ) Notice: Subject to any disclaimer, the term of this patent is extended or adjusted under 35 U.S.C. 154(b) by 249 days.

(21) Appl. No.: 13/668,328

(22) Filed: Nov. 5, 2012

(65) Prior Publication Data

US 2013/0176277 A1 Jul. 11, 2013

Related U.S. Application Data

(60) Provisional application No. 61/583,613, filed on Jan. 6, 2012.

(30) Foreign Application Priority Data

May 16, 2012 (TW) .............................. 101117418 A (51) Int. Cl.
*G06F 3/044* (2006.01)
(52) U.S. Cl.
CPC ..................................... *G06F 3/044* (2013.01)
(58) Field of Classification Search
CPC ..... G06K 3/044; G06K 3/0418; H03K 17/96; H03K 2217/96062
USPC ........................................................ 345/174
See application file for complete search history.

(56) References Cited

U.S. PATENT DOCUMENTS

| 2007/0268272 A1* | 11/2007 | Perski et al. ................... 345/173 |
| 2009/0027350 A1* | 1/2009 | Lee et al. ........................ 345/173 |
| 2009/0108914 A1* | 4/2009 | Zhang et al. ................... 327/517 |
| 2010/0315102 A1* | 12/2010 | Portmann ....................... 324/680 |
| 2011/0109585 A1* | 5/2011 | Kwon et al. .................... 345/174 |
| 2011/0115502 A1* | 5/2011 | Lin et al. ........................ 324/679 |
| 2011/0261005 A1* | 10/2011 | Joharapurkar et al. ........ 345/174 |

FOREIGN PATENT DOCUMENTS

| TW | 200733036 A | 9/2007 |
| TW | 200845580 A | 11/2008 |
| TW | 200937837 A | 9/2009 |
| TW | 200945156 A | 11/2009 |
| WO | WO2009/090534 A2 | 7/2009 |

* cited by examiner

*Primary Examiner* — Seokyun Moon
*Assistant Examiner* — Peijie Shen
(74) *Attorney, Agent, or Firm* — CKC & Partners Co., Ltd.

(57) ABSTRACT

A touch sensing device includes a touch sensing trace layout, a comparator and a variable capacitor unit. The touch sensing trace layout performs a sensing operation according to at least one first driving signal in a sensing state. An input of the comparator is electrically coupled to the touch sensing trace layout for receiving a sensing signal outputted by the touch sensing trace layout. The variable capacitor unit is selectively coupled to one of the inputs of the comparator, for correspondingly performing potential compensation to the sensing signal received by the input of the comparator according to at least one second driving signal.

20 Claims, 3 Drawing Sheets

TOUCH SENSING DEVICE

RELATED APPLICATIONS

This application claims priority to Provisional Application Ser. No. 61/583,613 filed on Jan. 6, 2012 and Taiwan Patent Application Serial Number 101117418, filed May 16, 2012, which are herein incorporated by reference.

BACKGROUND

1. Technical Field

The present disclosure relates to a sensing device. More particularly, the present disclosure relates to a touch sensing device.

2. Description of Related Art

For high technology nowadays, user interfaces of more and more electronic products have already employed touch panels, such that demands for touch sensing devices have increasingly matured. Touch sensing devices have already become the basis of any kind of user interface, and replacing traditional keyboard interface with touch sensing interface undoubtedly makes the user interface become more intuitional and easier for use.

Moreover, one of ordinary skill in the art can use the touch sensing interface to substitute mechanical keys necessary in various applications such as access control, mobile phone, MP3 player, personal computer peripherals, remote controller, etc., and costs for manufacturing products can thus be saved.

However, for example in a capacitive touch sensing device, many capacitors are usually required for performing a touch sensing operation, and a circuit layout area occupied by these capacitors is significantly large, such that the size of the touch sensing device cannot be effectively reduced and the high manufacturing cost for the touch sensing device is also necessary.

Moreover, in a conventional touch sensing device, once the circuit layout of the capacitors is set, the sensitivity of the touch sensing device itself is also fixed accordingly and cannot be changed, such that the touch sensing operation performed by the touch sensing device cannot be flexibly adjusted based on extrinsic practical situations or user's conditions.

In conclusion, typical touch sensing devices all have the problem of having a too large circuit layout area occupied by these capacitors and the problem of being unable to be flexibly adjusted according to practical needs.

SUMMARY

In accordance with one embodiment of the present disclosure, a touch sensing device is provided. The touch sensing device includes a touch sensing trace layout, a comparator and a variable capacitor unit. The touch sensing trace layout is configured for performing a sensing operation according to at least one first driving signal in a sensing state. The comparator includes a first comparator input and a second comparator input, and the first comparator input and the second comparator input are both electrically coupled to the touch sensing trace layout and configured for receiving sensing signals outputted by the touch sensing trace layout. The variable capacitor unit is selectively coupled to the first comparator input or the second comparator input, for correspondingly performing potential compensation to the sensing signal received by the first comparator input or the second comparator input according to at least one second driving signal.

In accordance with one embodiment of the present disclosure, a touch sensing device is provided. The touch sensing device includes a touch sensing trace layout, a comparator and a variable capacitor unit. The touch sensing trace layout is configured for performing a sensing operation according to at least one first driving signal in a sensing state. The comparator includes a first comparator input and a second comparator input, in which the first comparator input is electrically coupled to the touch sensing trace layout and configured for receiving a sensing signal outputted by the touch sensing trace layout, and the second comparator input is electrically coupled to a reference voltage source. The variable capacitor unit is coupled to the first comparator input and configured for correspondingly performing potential compensation to the sensing signal received by the first comparator input according to at least one second driving signal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following description, specific details are presented to provide a thorough understanding of the embodiments of the present disclosure. Persons of ordinary skill in the art will recognize, however, that the present disclosure can be practiced without one or more of the specific details, or in combination with other components. Weil-known implementations or operations are not shown or described in detail to avoid obscuring aspects of various embodiments of the present disclosure.

The terms used in this specification generally have their ordinary meanings in the art and in the specific context where each term is used. The use of examples anywhere in this specification, including examples of any terms discussed herein, is illustrative only, and in no way limits the scope and meaning of the disclosure or of any exemplified term. Likewise, the present disclosure is not limited to various embodiments given in this specification.

As used herein, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated or meaning other approximate values.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, Le, to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

The terms "perpendicular to" and "in parallel" regarding the arrangements also include "substantially in perpendicular to" and "substantially in parallel with", respectively, throughout the specification and the claims of the present application.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

Figure 1:
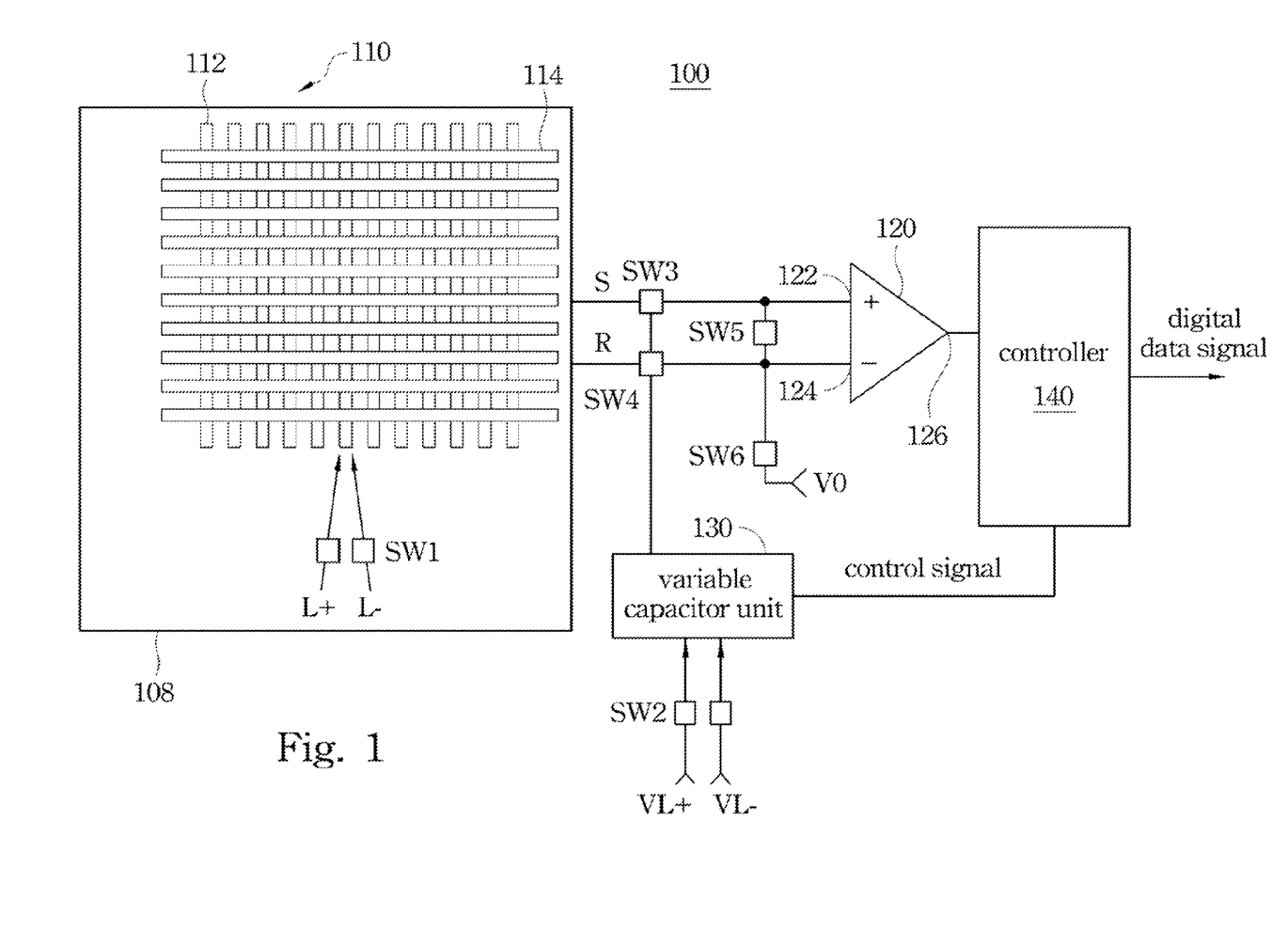
FIG. 1 is a schematic diagram of a touch sensing device according to a first embodiment of the present disclosure.

FIG. 1 is a schematic diagram of a touch sensing device according to a first embodiment of the present disclosure. As shown in FIG. 1, the touch sensing device 100 includes a touch sensing trace layout 110, a comparator 120 and a variable capacitor unit 130. The touch sensing trace layout 110 is configured for performing a sensing operation according to at least one first driving signal e.g., driving signal L+ shown in FIG. 1) in a sensing state, such that the touch sensing trace layout 110 outputs one or more sensing signals corresponding to a touch event (e.g., the touch sensing trace layout 110 is touched by finger, stylus pen, etc.). The comparator 120 includes a first comparator input 122, a second comparator input 124, and a comparator output 126, in which the first comparator input 122 and the second comparator input 124 may be electrically coupled to the touch sensing trace layout 110 respectively through a path S and a path R, for receiving the sensing signals outputted by the touch sensing trace layout 110. The variable capacitor unit 130 is selectively coupled through the path S to the first comparator input 122 or coupled through the path R to the second comparator input 124, for correspondingly performing potential compensation to the sensing signal received by the first comparator input 122 or the second comparator input 124 according to at least one second driving signal (e.g., driving signal VL+ shown in FIG. 1). In one embodiment, the first driving signal can be the same as or different from the second driving signal. In another embodiment, a level of the second driving signal is a multiple (e.g., 4 times or ¼ times) of a level of the first driving signal.

Specifically, each of the path S and the path R has a corresponding potential, and in the condition of the driving signal L+ or L− being applied to the touch sensing trace layout 110. When the touch sensing trace layout 110 is touched by an object (e.g., finger, stylus pen, etc.), the touch sensing trace layout 110 outputs the corresponding sensing signal through the path S or the path R, in which the sensing signal can represent the voltage or potential change of the path S or the path R.

In detail, a capacitance (typically called "mutual capacitance") exists between the touch sensing trace layout 110 and each of the path S and the path R, and another capacitance (typically called "self capacitance") also exists between a ground (terminal) and each of the path S and the path R. In the condition that the touch sensing trace layout 110 is touched by the object, the capacitance between the touch sensing trace layout 110 and the path S (or the path R) changes, such that the potential of the path S or the path R changes correspondingly. At the moment, the variable capacitor unit 130 can be selectively coupled through the path S to the first comparator input 122, or coupled through the path R to the second comparator input 124, so as to correspondingly perform the potential compensation to the potential of the path S (e.g., the first comparator input 122) or the path R (e.g., the second comparator input 124) according to the driving signals VL+ or VL−, such that the potential of the path S or the path R can be balanced, and the potential or capacitance variation corresponding to the touch sensing operation can thus be obtained for sequential data processing.

For example, in the condition of the driving signal L+ (e.g. a pulse signal having a voltage level of 5V) being applied to the touch sensing trace layout 110, when the touch sensing trace layout 110 is touched, the touch sensing trace layout 110 outputs the corresponding sensing signal through the path S (i.e. the potential of the path S changes). At the moment, the variable capacitor unit 130 is coupled through the path R to the second comparator input 124 and correspondingly performs the potential compensation to the potential of the path R according to the driving signal VL+, such that the potential of the path S and the path R can be balanced, and the potential or capacitance variation of the path S, which corresponds to the touch sensing operation, can thus be obtained for sequential data processing.

At that moment, the sensing signals are transmitted on the path. S and the path R according to the corresponding touch event and have a capacitive (electrostatic) difference or unbalance therebetween. When the sensing signal on the path S or the path R is potential compensated selectively by the variable capacitor unit 130, the aforementioned difference or unbalance can be thus quantized so as to determine the touch position on the touch sensing trace layout 110, which corresponds to the outputted sensing signal. Furthermore, the comparator 120 processes the received sensing signal to output a differential signal to be sequentially converted into a digital data signal, and the digital data signal is provided for other elements in the touch sensing device 100 to operate accordingly, and users can then obtain the results generated from the touch operation on the touch sensing trace layout 110.

Moreover, as shown in FIG. 1, the touch sensing device 100 can further include a controller 140, and the controller 140 is electrically coupled to the comparator output 126 of the comparator 120 and configured for correspondingly outputting the digital data signal according to the signal outputted by the comparator 120, and also configured for generating a control signal transmitted to the variable capacitor unit 130 according to the output of the comparator 120, to modify an equivalent capacitance of the variable capacitor unit 130, for further correspondingly performing the potential compensation to the sensing signal received by the first comparator input 122 or the second comparator input 124 according to the second driving signal (e.g., the driving signal VL+).

In addition, the touch sensing device 100 can further include a substrate 108, in which the substrate 108 includes a thin film transistor liquid crystal panel, an organic light-emitting diode (OLED) panel, an electronic paper panel, a micro electro-mechanical system (MEMS) panel, a glass substrate or a transparent substrate. When the touch sensing trace layout 110 in the present disclosure is disposed on a glass substrate, the touch sensing device 100 is a touch panel. In addition, the touch sensing trace layout 110 can be in a form of a thin film to be attached to the thin film transistor liquid crystal panel, the OLED panel, the electronic paper panel or the MEMS panel, and the touch sensing device 100 can be an integrated touch panel or OGS (one glass solution) touch panel.

Furthermore, the touch sensing trace layout 110 can be integrated into a display cell layer of the thin film transistor liquid crystal panel or the OLED panel.

Moreover, the touch sensing trace layout 110 may include a plurality of first electrodes 112 and a plurality of second electrodes 114, and the first electrodes 112 are interlaced or interleaved with the second electrodes 114. In one embodiment, the first electrodes 112 and the second electrodes 114 are perpendicular to each other and thus interlaced, in which the first electrodes 112 are Y-axis electrodes, and the second electrodes 114 are X-axis electrodes. In one embodiment, the first electrodes 112 and the second electrodes 114 are interlaced to form a sensing array, at least one of the first electrodes 112 is driven (e.g., by the driving signal L+) to couple with at least one of the second electrodes 114 to form a sensing capacitance, and the sensing array generates corresponding sensing signals according to variations of the sensing capacitance. Notably, the skill of driving the first electrodes 112 with the driving signal, as mentioned above, does not indicate the skill of fixedly driving specific electrodes, but means dynamically driving the first electrodes 112, for example, from left to right with the driving signal.

In another embodiment, the first electrodes 112 can be X-axis electrodes, the second electrodes 114 are Y-axis electrodes, and the aforementioned elements other than the touch sensing trace layout 110 can be correspondingly disposed or modified. In yet another embodiment, the first electrodes 112 and the second electrodes 114 also can be arranged in an interdigital way on a same horizontal plane. In still another embodiment, the first electrodes 112 and the second electrodes 114 also can be arranged without being perpendicular to each other.

In practice, the first electrodes 112 can be stimulating electrodes, and the second electrodes 114 can be sensing electrodes. In one embodiment, the stimulating electrodes are disposed on a relatively upper layer, and the sensing electrodes are disposed on a relatively lower layer. In another embodiment, the stimulating electrodes are disposed on the relatively lower layer, and the sensing electrodes are disposed on the relatively upper layer.

In conclusion, the dispositions or arrangements of the first electrodes 112 and the second electrodes 114 can be changed or modified, and as is understood by a person skilled in the art, the foregoing embodiments of the present disclosure are illustrative of the present disclosure rather than limiting of the present disclosure. It is intended to cover various modifications and similar arrangements included within the spirit and scope of the appended claims, and the scope of which should be accorded with the broadest interpretation so as to encompass all such modifications and similar structures. In other words, the dispositions or arrangements, in which the sensing capacitances can be formed between the first electrodes 112 and the second electrodes 114, belong to the scope of embodiments in the present disclosure.

Figure 2:
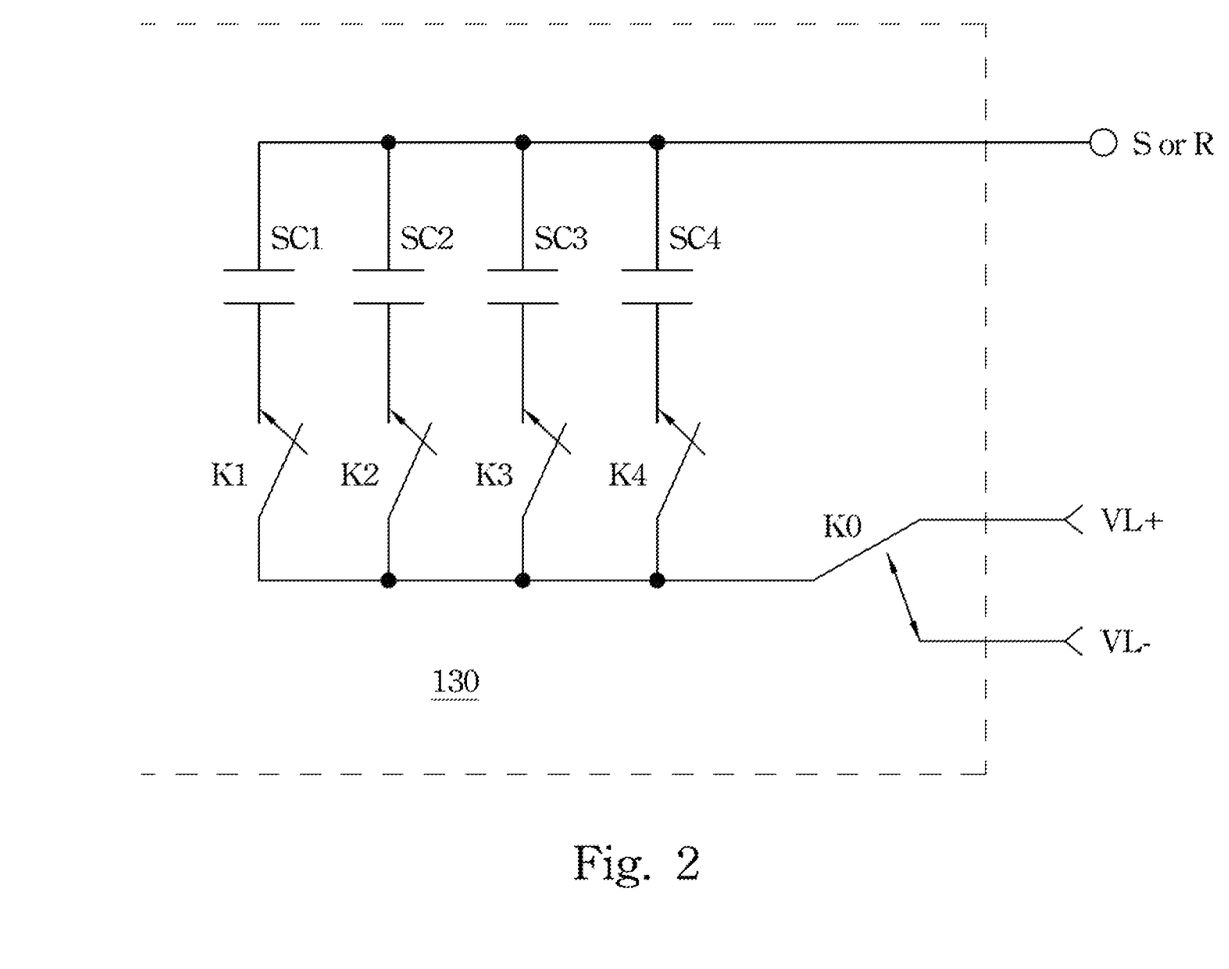
FIG. 2 is a schematic diagram of the variable capacitor unit as shown in FIG. 1 according to one embodiment of the present disclosure.

FIG. 2 is a schematic diagram of the variable capacitor unit as shown in FIG. 1 according to one embodiment of the present disclosure. As shown in FIG. 1 and FIG. 2, the variable capacitor unit 130 includes a plurality of switchable capacitors (e.g., switchable capacitors SC1, SC2, SC3, SC4), and the switchable capacitors SC1, SC2, SC3, SC4 are coupled in parallel with each other, in which one ends of the switchable capacitors SC1, SC2, SC3, SC4 are configured for commonly receiving the second driving signal (e.g., the driving signal VL+), and the other ends of the switchable capacitors SC1, SC2, SC3, SC4 are commonly coupled through the path S to the first comparator input 122, or through the path R to the second comparator input 124, according to the received second driving signal.

In one embodiment, when the controller 140 outputs the control signal to the variable capacitor unit 130, switches K1, K2, K3, K4 corresponding to the switchable capacitors SC1, SC2, SC3, SC4 are separately turned on or turned off according to the control signal, such that the switchable capacitors SC1, SC2, SC3, SC4 are respectively activated or deactivated, and thus the equivalent capacitance of the variable capacitor unit 130 can be correspondingly modified according to the control signal.

Therefore, in the touch sensing device 100, only a few capacitors are necessary to achieve quite sensitive touch sensing operations and thus the capacitors can be saved to further reduce the circuit layout area occupied by the capacitors, such that the size of the touch sensing device 100 can be significantly reduced and the manufacturing cost can be decreased as well.

On the other hand, as shown in FIG. 1 and FIG. 2, the touch sensing trace layout 110 can perform the touch sensing operation according to a plurality of the first driving signals (e.g., the driving signals L+ and L−), and the variable capacitor unit 130 can be selectively coupled to the first comparator input 122 or the second comparator input 124, for correspondingly performing the potential compensation to the sensing signal received by the first comparator input 122 or the second comparator input 124 according to the second driving signals (e.g., the driving signals VL+ and VL−). The first driving signals L+ and L− can be the same as or different from the second driving signals VL+ and VL−.

Accordingly, in the embodiment shown in FIG. 2, the switch K0 can be switched according to the control signal, one ends of the switchable capacitors SC1, SC2, SC3, SC4 can commonly receive one of the second driving signals, La, the driving signal VL+ or VL−, by the switching of the switch K0, and the other ends of the switchable capacitors SC1, SC2, SC3, SC4 can be commonly coupled through the path S to the first comparator input 122, or through the path R to the second comparator input 124, according to the received second driving signal (the driving signal. VL+ or VL−). Similarly, the switches K1, K2, K3, K4 corresponding to the switchable capacitors SC1, SC2, SC3, SC4 can be separately turned on or turned off according to the control signal, such that the switchable capacitors SC1, SC2, SC3, SC4 are respectively activated or deactivated, and thus the equivalent capacitance of the variable capacitor unit 130 can be correspondingly modified according to the control signal.

In addition, in the condition of the first driving signals L+ and L− being different from the second driving signals VL+ and VL−, the level of each of the second driving signals VL+ and VL− can be a multiple of the level of each of the first driving signals L+ and L−, in which the multiple can be an integer (e.g., 4), a fraction (e.g., ¼) or any number. For example, in the condition that the maximum equivalent capacitance of the variable capacitor unit 130 is fixed, when the capacitive difference or unbalance between the sensing signals on the path S and the path R is too large, the levels of the second driving signals VL+ and VL− can be modified by a programmable device or an amplifying device to be 4 times the levels of the first driving signals L+ and L−, such that the variable capacitor unit 130 can correspondingly perform the potential compensation to the sensing signal received by the first comparator input 122 (the path 5) or the second comparator input 124 (the path R) according to the second driving signal VL+ or VL− having the amplified level, or the capacitance required by the variable capacitor unit 130 can be decreased by increasing the value of the driving signal VL+ or VL− (for example in regard to the equation Q=CV, in the condition of the charge or potential being determined, when the voltage increases, the capacitance decreases correspondingly).

Therefore, in the touch sensing device 100, in the condition that the maximum equivalent capacitance is fixed, the sensitivity of the touch sensing device 100 itself can be modified by variations of the driving signal VL+ or VL−, such that the touch sensing operation performed by the touch sensing device 100 can be flexibly adjusted based on extrinsic practical situations or user's conditions.

Furthermore, in the embodiment shown in FIG. 1, the touch sensing device 100 may further include switches SW1 and SW2, in which the first driving signals L+ and L− can selectively drive the first electrodes 112 separately through the switch SW1, and the second driving signal VL+ and VL− can selectively be inputted into the variable capacitor unit 130 separately through the switch SW2. Moreover, the touch sensing device 100 may further include switches SW3, SW4, SW5 and SW6, in which the variable capacitor unit 130 can be electrically coupled to the first comparator input 122 and the second comparator input 124 respectively through the switches SW3 and SW4, and the first comparator input 122 and the second comparator input 124 can be electrically coupled to each other through the switch SW5. In operation, in an initial state (e.g., the touch sensing device 100 does not perform touch sensing operations), the first comparator input 122 and the second comparator input 124 can be coupled to an initial voltage V0 through the switching of the switches SW5 and SW6, and in a sensing state (e.g., the touch sensing device 100 performs touch sensing operations), the variable capacitor unit 130 can selectively be coupled to the first comparator input 122 or the second comparator input 124 through the switching of the switches SW3 and SW4.

Notably, the aforementioned elements or devices other than the touch sensing trace layout 110 can all be integrated into a signal processing circuit (e.g., analog-to-digital converter circuit), and the aforementioned driving signals can be various signals such as pulse signals, voltage signals, etc., and can be generated and dynamically modified by a micro-controller (MCU), and moreover, the levels of the driving signals can be modified by the programmable device or the amplifying device, and thus it is not limited thereto.

Figure 3:
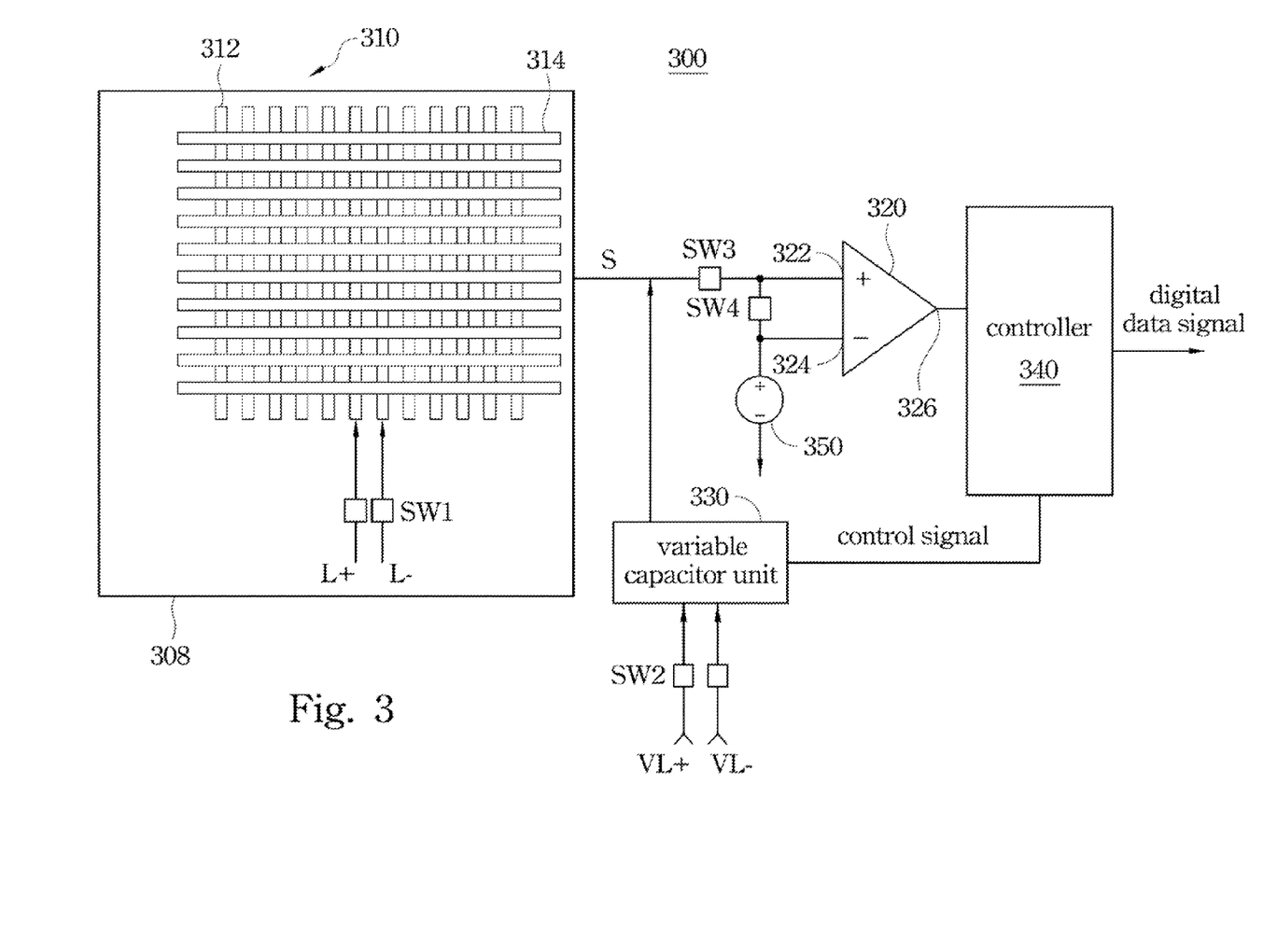
FIG. 3 is a schematic diagram of a touch sensing device according to a second embodiment of the present disclosure.

FIG. 3 is a schematic diagram of a touch sensing device according to a second embodiment of the present disclosure. As shown in FIG. 3, the touch sensing device 300 includes a touch sensing trace layout 310, a comparator 320 and a variable capacitor unit 330. The touch sensing trace layout 310 is configured for performing a sensing operation according to at least one first driving signal (e.g., the driving signal L+) in a sensing state, such that the touch sensing trace layout 310 outputs one or more sensing signals corresponding to a touch event (e.g., the touch sensing trace layout 310 is touched by finger, stylus pen, etc.). The comparator 320 includes a first comparator input 322, a second comparator input 324, and a comparator output 326, in which the first comparator input 322 is electrically coupled through the path S to the touch sensing trace layout 310 and configured for receiving the sensing signal outputted by the touch sensing trace layout 310, and the second comparator input 324 is electrically coupled to a reference voltage source Vref, in which a voltage level of the reference voltage source Vref may be configured between the level of a power voltage and the level of a ground voltage. The variable capacitor unit 330 is coupled through the path S to the first comparator input 322, for correspondingly performing potential compensation to the sensing signal received by the first comparator input 322 according to at least one second driving signal (e.g., the driving signals VL+ or VL−).

For example, in the condition of the driving signals L+ and L− being applied to the touch sensing trace layout 310 at the same time, when the touch (sensing) position leans toward or approaches to the electrode(s) receiving the driving signal L+, the variable capacitor unit 330 is coupled through the path S to the first comparator input 322 and correspondingly performs the potential compensation to the sensing signal received by the first comparator input 322 according to, for example, the driving signal VL−.

In one embodiment, the first driving signal can be the same as or different from the second driving signal. In another embodiment, the level of the second driving signal is a multiple (e.g., 4 times or ¼ times) of the level of the first driving signal. The operation of the potential compensation is similar to the embodiment shown in FIG. 1, and thus it is not described in further detail herein.

As shown in FIG. 3, the touch sensing device 300 may further include a controller 340 being electrically coupled to the comparator output 326 of the comparator 320 and configured for correspondingly outputting the digital data signal, and the controller 340 generates a control signal transmitted to the variable capacitor unit 330 according to the output of the comparator 320 to modify the equivalent capacitance of the variable capacitor unit 330, for further correspondingly performing the potential compensation to the sensing signal received by the first comparator input 322 according to the second driving signal (e.g., the driving signal VL+).

In addition, the touch sensing device 300 can further include a substrate 308, in which the substrate 308 includes a thin film transistor liquid crystal panel, an organic light-emitting diode (OLED) panel, an electronic paper panel, a micro electro-mechanical system (MEMS) panel, a glass substrate or a transparent substrate. When the touch sensing trace layout 310 in the present disclosure is disposed on a glass substrate, the touch sensing device 300 is a touch panel. In addition, the touch sensing trace layout 310 also can be fabricated in the form of a thin film adhered to the thin film transistor liquid crystal panel, the OLED panel, the electronic paper panel, or the MEMS panel, and at the moment the touch sensing device 300 is an integrated touch panel or OGS (one glass solution) touch panel. Furthermore, the touch sensing trace layout 310 can be integrated into a display cell layer of the thin film transistor liquid crystal panel or the OLED panel as well.

Moreover, the touch sensing trace layout 310 may include a plurality of first electrodes 312 and a plurality of second electrodes 314, and the first electrodes 312 are interlaced or interleaved with the second electrodes 314. In the present embodiment, the arrangements and operations of the first electrodes 312 and the second electrodes 314 are similar to the embodiment shown in FIG. 1, and thus it is not described in further detail herein.

Furthermore, the variable capacitor unit 330 can also include a plurality of switchable capacitors (e.g., switchable capacitors SC1, SC2, SC3, SC4) as shown in FIG. 2, and the switchable capacitors SC1, SC2, SC3, SC4 are coupled in parallel with each other, in which one ends of the switchable capacitors SC1, SC2, SC3, SC4 are configured for commonly receiving the second driving signal (e.g., the driving signal VL+), and the other ends of the switchable capacitors SC1, SC2, SC3, SC4 are commonly coupled through the path S to the first comparator input 322 according to the received second driving signal. The operations of the switchable capacitors in the variable capacitor unit 330 are similar to the embodiment shown in FIG. 2, and thus it is not described in further detail herein.

Therefore, in the touch sensing device 300, only a few capacitors are necessary to achieve quite sensitive touch sensing operations and thus the capacitors can be saved to further reduce the circuit layout area occupied by the capacitors, such that the size of the touch sensing device 300 can be significantly reduced and the manufacturing cost can be decreased as well.

On the other hand, as shown in FIG. 3, the touch sensing trace layout 310 can perform the touch sensing operation according to a plurality of the first driving signals (e.g., the driving signals L+ and L−), and the variable capacitor unit 330 can be coupled to the first comparator input 322 according to the second driving signals (e.g., the driving signals VL+ and VL−), in which the first driving signals L+ and L− can be the same as or different from the second driving signals VL+ and VL−.

Similarly, in the condition of the first driving signals L+ and L− being different from the second driving signals VL+ and VL−, the level of each of the second driving signals VL+ and VL− can be a multiple of the level of each of the first driving signals L+ and L−, in which the multiple can be an integer (e.g., 1, 2, 3, 4, etc.), a fraction (e.g., ½, ⅓, ¼, etc.) or any number. For example, in the condition that the maximum equivalent capacitance of the variable capacitor unit 330 is fixed, when the capacitive difference or unbalance between the sensing signals on the path S and the path R is too large, the levels of the second driving signals VL+ and VL− can be modified by a programmable device or an amplifying device to be 4 times the levels of the first driving signals L+ and L−, such that the variable capacitor unit 330 can correspondingly perform the potential compensation to the sensing signal received by the first comparator input 322 (the path S) according to the second driving signal VL+ or VL− having the amplified level.

Therefore, in the touch sensing device 300, in the condition that the maximum equivalent capacitance is fixed, the sensitivity of the touch sensing device 300 itself can be modified by variations of the driving signal VL+ or VL−, such that the touch sensing operation performed by the touch sensing device 300 can be flexibly adjusted based on extrinsic practical situations or user's conditions.

Furthermore, in the embodiment shown in FIG. 3, the touch sensing device 300 may further include switches SW1, SW2, SW3 and SW4, in which the first driving signals L+ and L− can selectively drive the first electrodes 312 separately through the switch SW1, and the second driving signal VL+ and VL− can selectively be inputted into the variable capacitor unit 330 separately through the switch SW2. Moreover, the switch SW3 is coupled between the first comparator input 322 and the touch sensing trace layout 310, and the switch SW4 is coupled between the first comparator input 322 and the second comparator input 324. In operation, in an initial state (e.g., the touch sensing device 300 does not perform touch sensing operations), the switch SW4 conducts the first comparator input 322 and the second comparator input 324 and the switch SW3 is turned off, and in a sensing state (e.g., the touch sensing device 300 performs touch sensing operations), the switch SW4 is turned off and the switch SW3 conducts the first comparator input 322 and the touch sensing trace layout 310.

Similarly, the aforementioned elements or devices other than the touch sensing trace layout 310 can all be integrated into a signal processing circuit (e.g., analog-to-digital converter circuit), and the aforementioned driving signals can be various signals such as pulse signals, voltage signals, etc., and can be generated and dynamically modified by a micro-controller (MCU), and moreover, the levels of the driving signals can be modified by the programmable device or the amplifying device, and thus it is not limited thereto.

For the aforementioned embodiments compared to prior art, the embodiments in the present disclosure can be applied such that only a few capacitors are necessary to achieve quite sensitive touch sensing operations and to save the capacitors, to further reduce the circuit layout area occupied by the capacitors, such that the size of the touch sensing device 300 can be significantly reduced and the manufacturing cost can be decreased as well. Moreover, in the condition that the maximum equivalent capacitance is fixed, the sensitivity of the touch sensing device itself can be modified by variations of the driving signal, such that the touch sensing operation performed by the touch sensing device can be flexibly adjusted based on extrinsic practical situations or user's conditions.

As is understood by a person skilled in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A touch sensing device, comprising:
a touch sensing trace layout configured for performing a sensing operation according to at least one first driving signal in a sensing state;
a comparator comprising a first comparator input and a second comparator input, the first comparator input and the second comparator input both electrically coupled to the touch sensing trace layout and configured for receiving sensing signals outputted by the touch sensing trace layout; and
a variable capacitor unit configured to selectively receive a second driving signal and a third driving signal, and selectively coupled to the first comparator input or the second comparator input,
wherein when the sensing signal is received by the first comparator input, the variable capacitor unit correspondingly performs potential compensation to the second comparator input according to one of the second driving signal and the third driving signal;
wherein the variable capacitor unit comprises a switch, and the switch is configured to switch from receiving one of the second driving signal and the third driving signal to receiving the other one of the second driving signal and the third driving signal, wherein the second driving signal has a positive voltage level while the third driving signal has a negative voltage level, and the second driving signal has a negative voltage level while the third driving signal has a positive voltage level.

2. The touch sensing device as claimed in claim 1, wherein the variable capacitor unit further comprises:
a plurality of switchable capacitors coupled in parallel with each other, wherein one ends of the switchable capacitors are configured for commonly receiving one of the second driving signal and the third driving signal through the switch, and the other ends of the switchable capacitors are commonly coupled to the first comparator input or the second comparator input.

3. The ouch sensing device as claimed in claim 1, further comprising:
a controller for generating a control signal transmitted to the variable capacitor unit according to an output of the comparator, to modify an equivalent capacitance of the variable capacitor unit.

4. The touch sensing device as claimed in claim 3, wherein the variable capacitor unit further comprises:
a plurality of switchable capacitors coupled in parallel to the first comparator input or the second comparator input, each of the switchable capacitors selectively activated or deactivated according to the control signal.

5. The touch sensing device as claimed in claim 1, wherein a level of one of the second driving signal and the third driving signal is a multiple of a level of the first driving signal.

6. The touch sensing device as claimed in claim 1, further comprising:
a controller for determining whether the touch sensing trace layout is touched according to a variation corresponding to the potential compensation, to further determine a touch position on the touch sensing trace layout.

7. The touch sensing device as claimed in claim 1, wherein the touch sensing trace layout is configured for performing the sensing operation according to a plurality of the first driving signals in the sensing state, and the variable capacitor unit further comprises:
a plurality of switchable capacitors coupled in parallel with each other, wherein one ends of the switchable capacitors are configured for selectively receiving one of the second driving signal and the third driving signal through the switch, the other ends of the switchable capacitors are commonly coupled to the first comparator input or the second comparator input, and the first driving signals are the same as or different from the second driving signal and the third driving signal.

8. The touch sensing device as claimed in claim 7, further comprising:
a controller for generating a control signal according to an output of the comparator, for controlling the switchable capacitors to be activated or deactivated respectively.

9. The touch sensing device as claimed in claim 7, wherein a level of each one of the second driving signal and the third driving signal is a multiple of a level of each of the first driving signals.

10. A touch sensing device, comprising:
a touch sensing trace layout configured for performing a sensing operation according to at least one first driving signal in a sensing state;
a comparator comprising a first comparator input and a second comparator input, the first comparator input electrically coupled to the touch sensing trace layout and configured for receiving a sensing signal outputted by the touch sensing trace layout, the second comparator input electrically coupled to a reference voltage source; and
a variable capacitor unit coupled to the first comparator input and configured to selectively receive a second driving signal and a third driving signal, the variable capacitor unit configured for correspondingly performing potential compensation to the sensing signal received by the first comparator input according to one of the second driving signal and the third driving signal;
wherein the variable capacitor unit comprises a switch, and the switch is configured to switch from receiving one of the second driving signal and the third driving signal to receiving the other one of the second driving signal and the third driving signal, wherein the second driving signal and the third driving signal have different voltage levels.

11. The touch sensing device as claimed in claim 10, wherein the variable capacitor unit further comprises:
a plurality of switchable capacitors coupled in parallel with each other, wherein one ends of the switchable capacitors are configured for commonly receiving one of the second driving signal and the third driving signal through the switch and the other ends of the switchable capacitors are commonly coupled to the first comparator input.

12. The touch sensing device as claimed in claim 10, further comprising:
a controller for generating a control signal transmitted to the variable capacitor unit according to an output of the comparator, to modify an equivalent capacitance of the variable capacitor unit.

13. The touch sensing device as claimed in claim 12, wherein the variable capacitor unit further comprises:
a plurality of switchable capacitors coupled in parallel to the first comparator input, each of the switchable capacitors selectively activated or deactivated according to the control signal.

14. The touch sensing device as claimed in claim 10, wherein the first driving signal is the same as or different from one of the second driving signal and the third driving signal.

15. The touch sensing device as claimed in claim 10, further comprising:
a controller for determining whether the touch sensing trace layout is touched according to a variation corresponding to the potential compensation, to further determine a touch position on the touch sensing trace layout.

16. The touch sensing device as claimed in claim 10, wherein in the sensing state, the touch sensing trace layout is configured for performing the sensing operation according to a plurality of the first driving signals, the variable capacitor unit is configured for correspondingly performing the potential compensation to the sensing signal received by the first comparator input according to one of the second driving signal and the third driving signal, and the first driving signals are the same as or different from the second driving signal and the third driving signal.

17. The touch sensing device as claimed in claim 16, wherein the variable capacitor unit further comprises:
a plurality of switchable capacitors coupled in parallel with each other, wherein one ends of the switchable capacitors are configured for selectively receiving one of the second driving signal and the third driving signal through the switch, and the other ends of the switchable capacitors are commonly coupled to the first comparator input.

18. The touch sensing device as claimed in claim 17, further comprising:
a controller for generating a control signal according to an output of the comparator, for controlling the switchable capacitors to be activated or deactivated respectively.

19. The touch sensing device as claimed in claim 16, wherein the second driving signal and the third driving signal are different from the first driving signals, and a level of each of the second driving signal and the third driving signal is a multiple of a level of each of the first driving signals.

20. The touch sensing device as claimed in claim 1, further comprising:
  a first switch configured to connect or disconnect the first comparator input and the variable capacitor unit; and
  a second switch configured to connect or disconnect the second comparator input and the variable capacitor unit.

* * * * *